United States Patent [19]
Matheny et al.

[11] Patent Number: 5,725,353
[45] Date of Patent: Mar. 10, 1998

[54] TURBINE ENGINE ROTOR DISK

[75] Inventors: Alfred Paul Matheny, Jupiter, Fla.; Chen Yu J. Chou, Cincinnati, Ohio

[73] Assignee: United Technologies Corporation, Hartford, Conn.

[21] Appl. No.: 759,830

[22] Filed: Dec. 4, 1996

[51] Int. Cl.⁶ ............................................. F01D 5/32
[52] U.S. Cl. ........................ 416/214 A; 416/204 A; 416/222; 416/244 A; 403/337; 403/340
[58] Field of Search ..................... 416/204 R, 204 A, 416/214 R, 214 A, 219 R, 220 R, 222, 244 A, 248, 244 R; 403/335, 337, 340; 464/137

[56] References Cited

U.S. PATENT DOCUMENTS

| | | | |
|---|---|---|---|
| 3,916,495 | 11/1975 | Klassen et al. | 416/244 A |
| 4,022,547 | 5/1977 | Stanley. | |
| 4,098,559 | 7/1978 | Price. | |
| 4,108,572 | 8/1978 | Platt. | |
| 4,111,606 | 9/1978 | Prewo. | |
| 4,191,487 | 3/1980 | Schultenkamper | 403/337 |
| 4,191,510 | 3/1980 | Teysseyre et al. | |
| 4,364,160 | 12/1982 | Eiswerth et al. | |
| 4,369,149 | 1/1983 | Violett | 416/214 R |
| 4,452,567 | 6/1984 | Treby et al. | 416/204 A |
| 4,613,316 | 9/1986 | Reynolds | 464/137 |
| 5,135,354 | 8/1992 | Novotny. | |
| 5,273,401 | 12/1993 | Griffin. | |
| 5,277,548 | 1/1994 | Klein et al. | |
| 5,281,096 | 1/1994 | Harris et al. | |
| 5,292,231 | 3/1994 | Lauzeille. | |
| 5,340,280 | 8/1994 | Schilling. | |
| 5,388,964 | 2/1995 | Ciokajlo et al. | |
| 5,409,353 | 4/1995 | Imbault. | |
| 5,624,233 | 4/1997 | King et al. | 416/219 R |

FOREIGN PATENT DOCUMENTS

| | | | |
|---|---|---|---|
| 0614103 | 6/1935 | Germany | 416/244 R |
| 0472205 | 10/1975 | U.S.S.R. | 403/335 |

*Primary Examiner*—Christopher Verdier
*Attorney, Agent, or Firm*—Richard D. Getz

[57] ABSTRACT

A turbine engine rotor assembly disk is provided which includes a forward web, an aft web, a plurality of first stub shafts, and a plurality of second stub shafts. The first and second stub shafts have axial ends and web ends. The stub shafts are attached to the respective forward or aft web, at the web end. The first and second stub shafts are equal in number, similarly spaced around the axial centerline, and attached to one another by fasteners.

15 Claims, 5 Drawing Sheets

TURBINE ENGINE ROTOR DISK

BACKGROUND OF THE INVENTION

1. Technical Field

The present invention relates to gas turbine engine rotor assemblies in general, and to rotor assembly disks in particular.

2. Background Information

Axial turbine engines generally include fan, compressor, combustor and turbine sections positioned along a centerline referred to as the engines "axis of rotation". The fan, compressor, and combustor sections add work to air (also referred to as "core gas") flowing through the engine. The turbine extracts work from the core gas flow to drive the fan and compressor sections. The fan, compressor, and turbine sections each include a series of stator and rotor assemblies. The stator assemblies, which do not rotate (but may have variable pitch vanes), increase the efficiency of the engine by guiding core gas flow into or out of the rotor assemblies.

The rotor assemblies typically include a plurality of blades attached to and extending out from the circumference of a disk. It is known to attach rotor blades to a disk by "fir tree" blade roots or the like, received in complementary shaped recesses within the disk. A disadvantage of a "fir tree" type attachment scheme is that the disk must be sized relatively large to accommodate the stresses generated by the blades acting on the disk. Specifically, the disk must have sufficient area between adjacent recesses to handle the shear load placed on the recesses by the mating roots of the rotor blades. Another method of rotor blade attachment involves using a pin to hold the rotor blades to the disk. In a pinned application, the blade root of each blade necks down to a lug having an aperture for receiving a pin. The lug is received between flanges extending out from the disk. The pin extends through the disk flanges and blade lug to secure the blade to the disk. The entire load on the blade is borne by the pin, which in turn transfers the load to the disk flanges. To avoid undesirable stress levels, the cross-sectional area of the pin must be substantial and the disk must have adequate web material between adjacent pin apertures. Typically, adequate web material is attained by moving the pin apertures radially outward. The substantial pin diameter and radial position of the pin apertures often lead to a rotor disk having a weight and an internal flow path diameter greater than optimum.

Hence, what is needed is a gas turbine rotor assembly with minimal weight, one having a disk that can readily accommodate rotor blade loads, and one that has a minimal internal flow path diameter.

DISCLOSURE OF THE INVENTION

It is, therefore, an object of the present invention to provide an axial turbine engine rotor assembly that has a minimal internal flow path diameter.

It is another object of the present invention to provide an axial turbine engine rotor assembly of minimal weight.

It is another object of the present invention to provide a disk for an axial turbine engine that can accommodate rotor blade loads.

It is another object of the present invention to provide a rotor assembly for an axial turbine engine that uses composite blades.

According to the present invention, a turbine engine rotor assembly disk is provided which includes a forward web, an aft web, a plurality of first stub shafts, and a plurality of second stub shafts. The first and second stub shafts have axial ends and web ends. The stub shafts are attached to the forward or aft web, at the web end. The first and second stub shafts are equal in number, similarly spaced around the axial centerline, and attached to one another by fasteners.

In one embodiment of the present invention, the first and second stub shafts are skewed from the engine axis of rotation.

In another embodiment of the present invention, the first and second stub shafts spiral between webs.

An advantage of the present invention is that a rotor assembly disk is provided having a minimal internal flow path diameter. The stub shaft and web arrangement of the present invention manages stress within the webs in an efficient manner. As a result, less web material is required and the shaft radial position is closer to the axis of rotation than is possible using conventional blade attachment schemes.

Another advantage of the present application is that a lightweight rotor assembly disk is provided. The present invention disk uses mechanical advantage rather than material bulk to satisfy the loading requirements, thereby obviating the need for a larger, heavier rotor assembly disk.

Another advantage of the present invention is that the shafts holding the blades to the disk can be skewed and/or spiraled to accommodate blade loads. Aligning the stub shafts with the load transferred from the blade minimizes stress in the stub shafts and the webs, and thereby increases the load capacity of the disk. Skewing and/or spiraling the shafts also facilitates alignment between the airfoils and the blade root walls. Alignment between an airfoil and a blade root wall permits the radial pull lines of the airfoil to continue into the blade root and thereby minimize stresses elsewhere in the blade pair. "Radial pull line" is a term of art used to describe the force vectors extending through an airfoil. In the present case, the stub shaft and web arrangement of the present invention can accommodate a variety of blade root geometries which in turn permits greater alignment between blade root and airfoil.

These and other objects, features and advantages of the present invention will become apparent in light of the detailed description of the best mode embodiment thereof, as illustrated in the accompanying drawings.

BEST MODE FOR CARRYING OUT THE INVENTION

Figure 1:
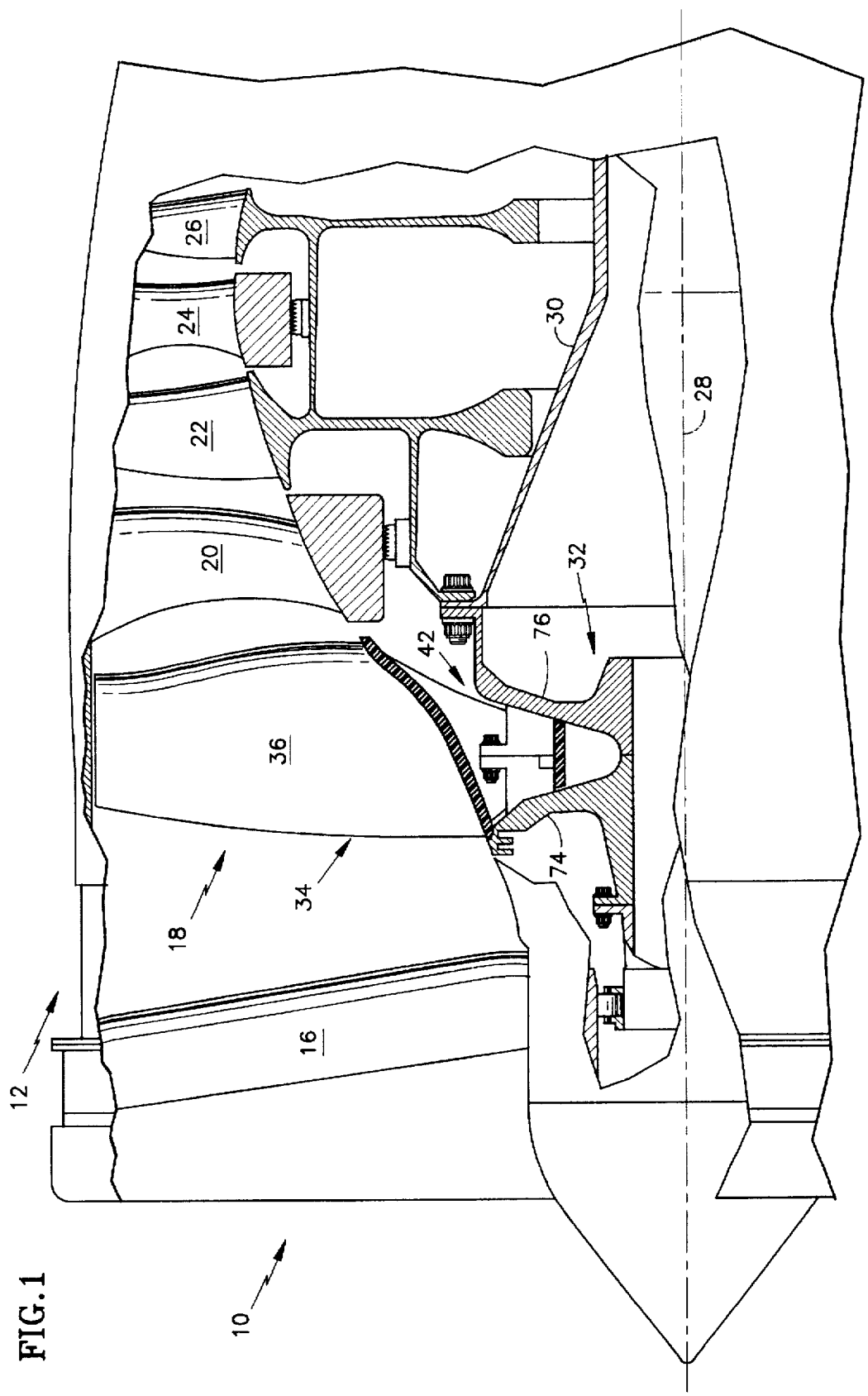
FIG. 1 is a diagrammatic sectional view of the fan section of a gas turbine engine.

Referring to FIG. 1, an axial turbine engine 10 includes a fan section 12 which has a plurality of inlet guide vanes 16, a first rotor stage 18, a first stator stage 20, a second rotor stage 22, a second stator stage 24, and a third rotor stage 26, positioned forward to aft respectively. Forward is defined as being upstream of aft. The inlet guide vanes 16 and the stator stages 20, 24 guide air into, or out of, the rotor stages 18,22,26. The first, second, and third rotor stages 18,22,26 rotate about the axis of rotation 28 of the engine 10. A spool 30 powered by a downstream turbine (not shown) drives the fan rotor stages 18,22,26. The first rotor stage 18 includes a rotor disk 32 and a plurality of rotor blade pairs 34, distributed around the circumference of the disk 32.

I. The Rotor Blades

Referring to FIGS. 2–6, each rotor blade pair 34 includes a first airfoil 36, a second airfoil 38, a platform 40, and a root 42. The platform 40 has a forward edge 44, an aft edge 46, an outer radial surface 48, and an inner radial surface 50. The airfoils 36,38 are spaced apart and substantially parallel to one another, and extend out from the outer radial surface 48 of the platform 40. The root 42 of each blade pair 34 includes a first 52 and a second 54 root wall, integrally attached to one another, extending out from the inner radial surface 50 of the platform 40. The hollow 56 formed between blade root walls 52,54 has a cross-sectional geometry similar to that of the rotor disk stub shafts 86,98 (discussed in more detail hereinafter).

Figure 4:
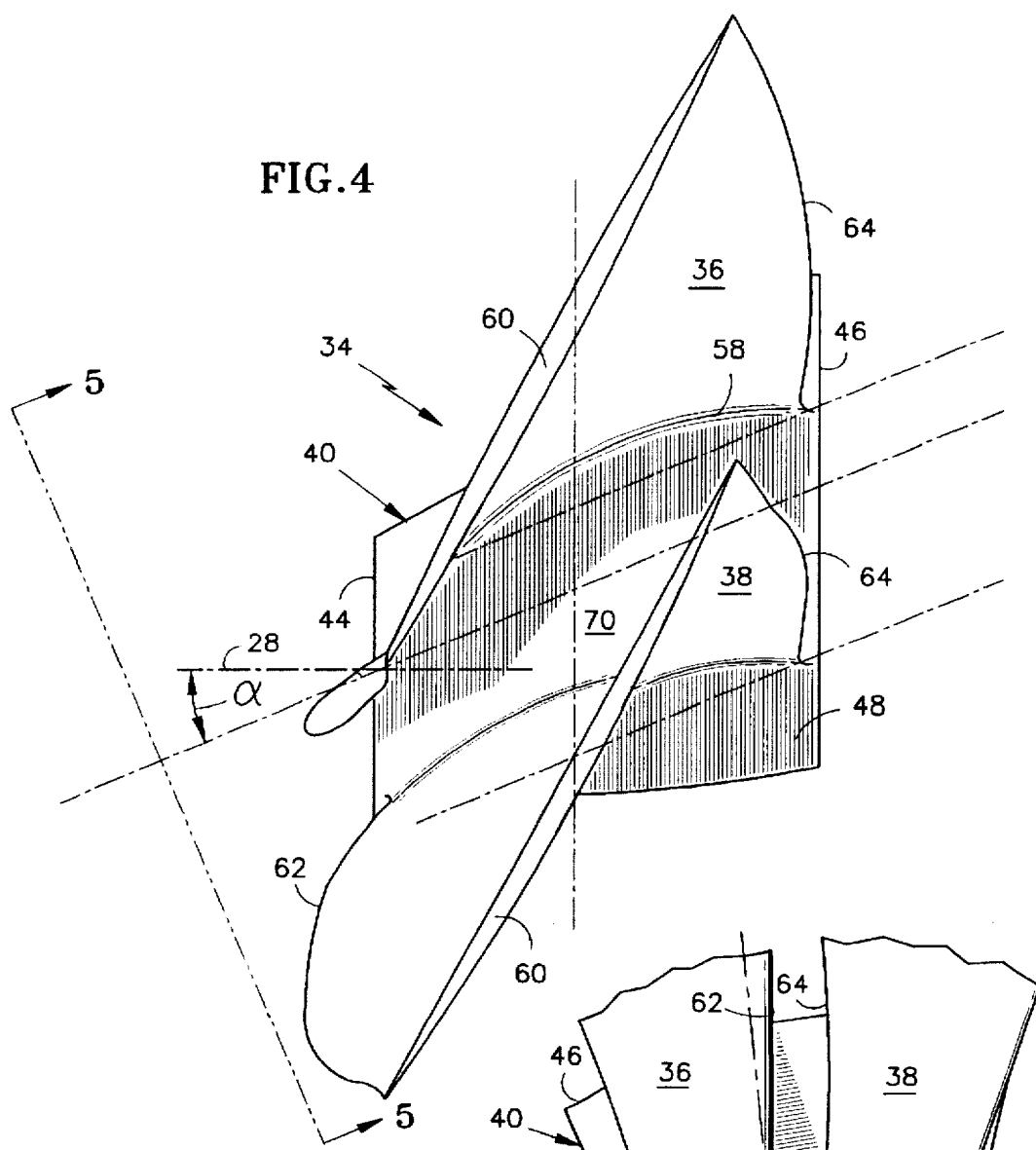
FIG. 4 is a diagrammatic radially inward view of the blade pair shown along 4—4 of FIG. 3.
Figure 5:
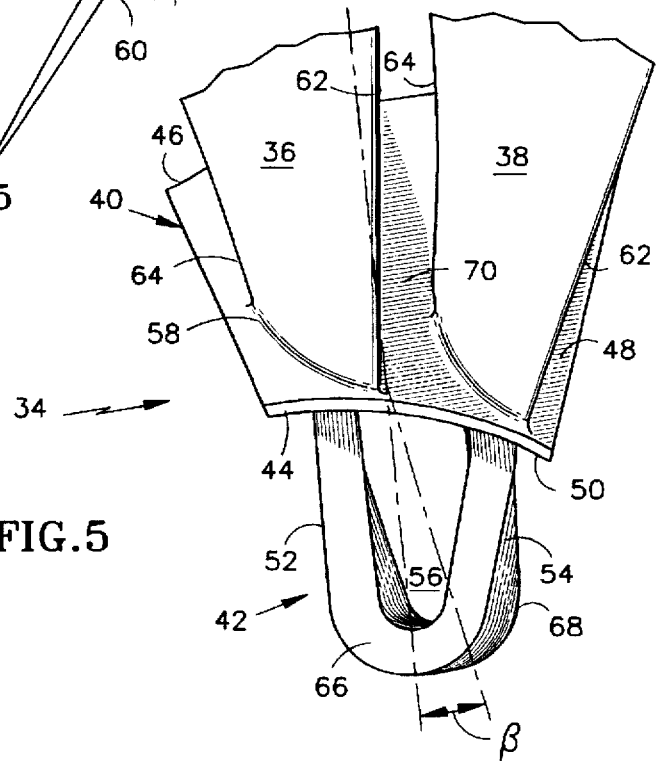
FIG. 5 is a diagrammatic axial view of the blade pair shown along 5—5 of FIG. 4.
Figure 7:
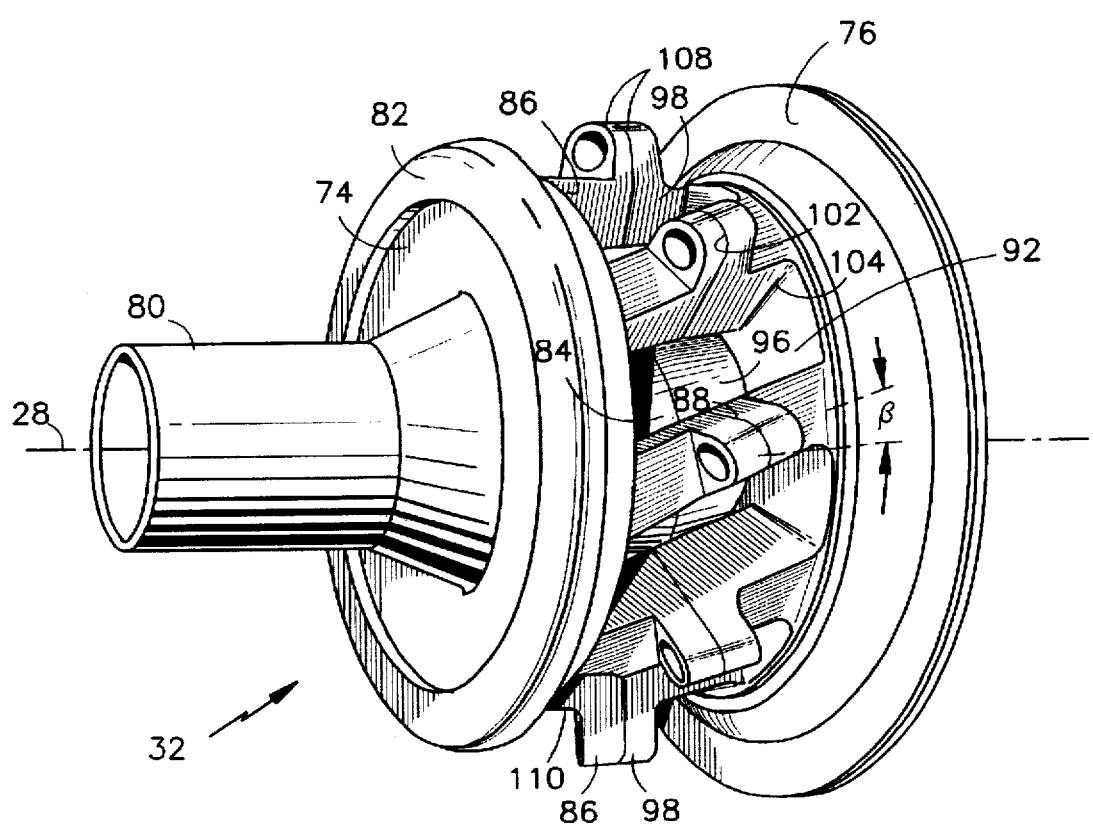
FIG. 7 is a diagrammatic perspective view of the present invention rotor disk.
Figure 8:
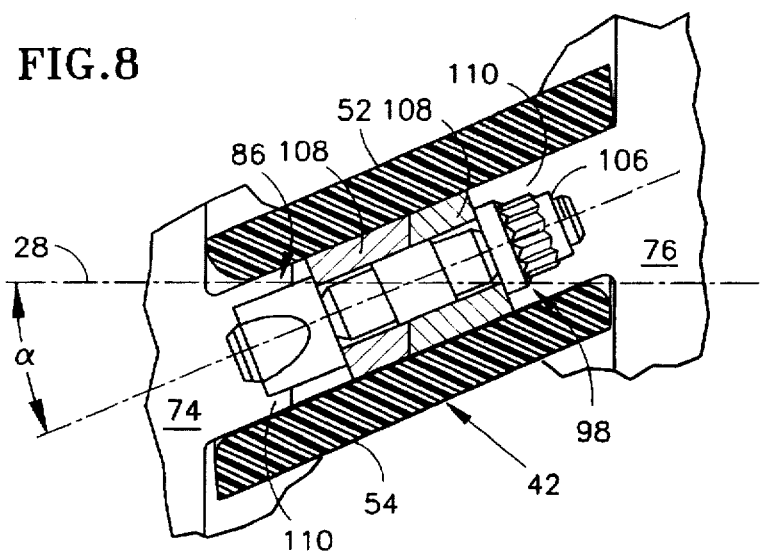
FIG. 8 is a diagrammatic perspective, partially in section, looking radially inward toward the disk, showing a pair of stub shafts extending out from the respective web, coupled with a fastener.

Referring to FIGS. 4 and 5, for aerodynamic reasons the airfoils 36,38 are skewed from the axis of rotation 28 by an angle "α" which extends between the chord line of the airfoils 36,38 and the axis of rotation 28. In addition, the blade pair airfoils 36,38 spiral in a compound manner between the base 58 and the tip 60, and between the forward 62 and aft 64 edges, of each airfoil 36,38. At the base 58 of each airfoil 36,38, the airfoil spirals almost exclusively around an axis extending between the forward 62 and aft 64 edges. The base 58 to tip 60 component of the airfoil spiral increases with radial position away the base 58, and is therefore less significant at the base 58. As a result of the spiral, the airfoils 36,38 do not intersect the platform 40 along a constant plane. A person of skill in the art will recognize that aerodynamic, manufacturing, and stress concerns influence the exact contour of most rotor blade airfoils, and that the airfoil contour may have small anomalies that deviate from the symmetry of the airfoil.

Each blade root wall 52,54 is substantially aligned with one of the airfoils 36,38 and consequently spirals in a manner equal to, or nearly equal to, that of the airfoil 36,38. The blade root walls 52,54, like the airfoils 36,38, may have small anomalies that deviate from the symmetry of the blade root walls 52,54. The angle "β" shown in FIG. 5 illustrates the amount of spiral within the blade root 42 between the forward 66 and aft 68 edges of the blade root 42.

Figure 2:
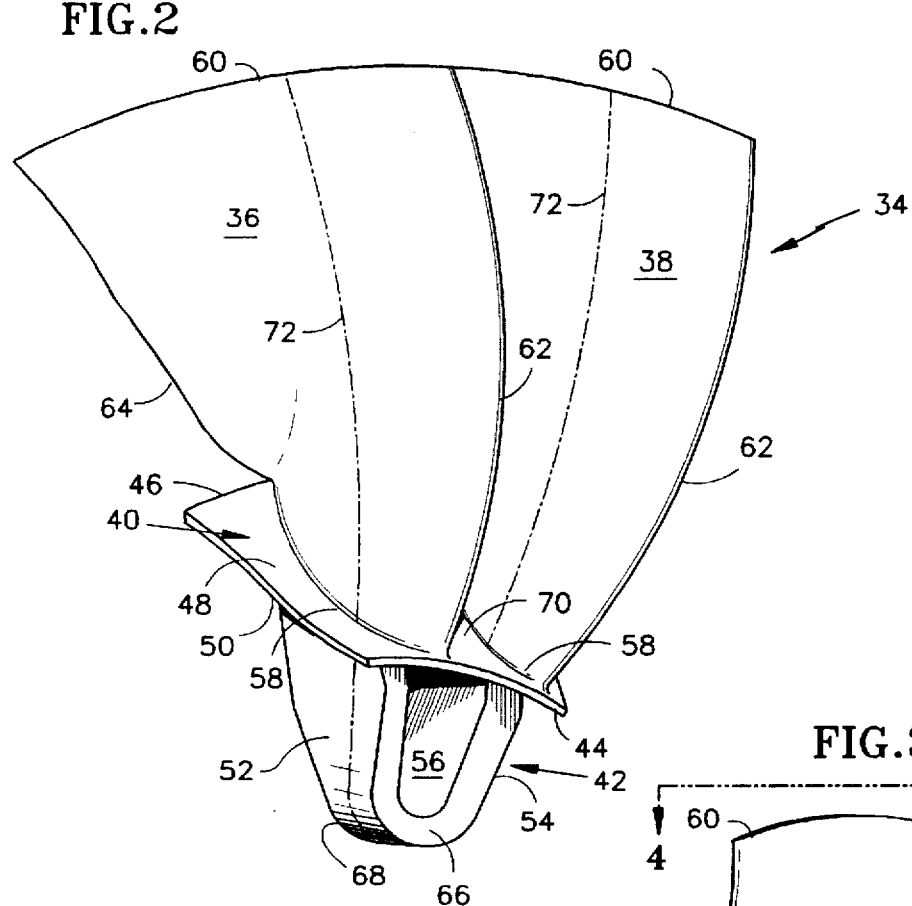
FIG. 2 is a diagrammatic perspective view of the present invention rotor blade pair.
Figure 3:
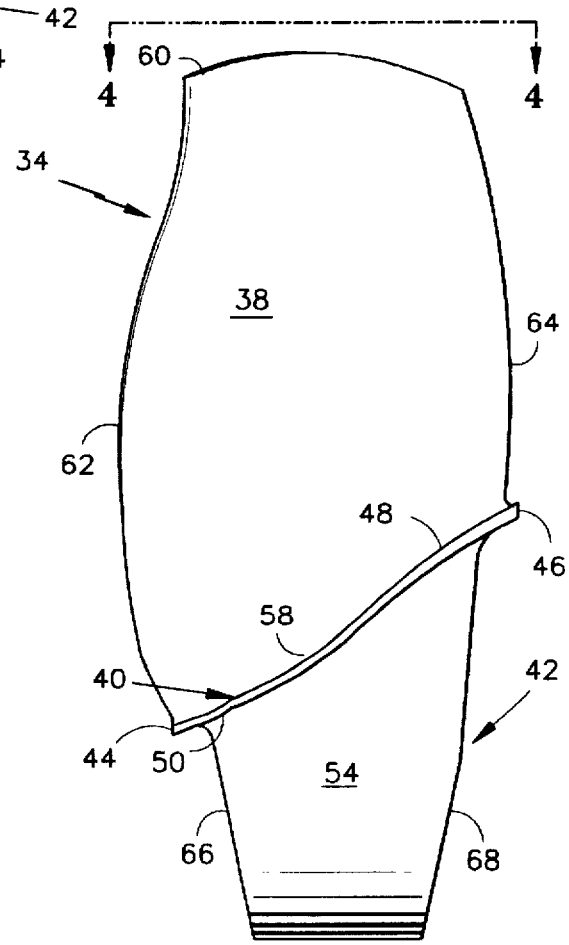
FIG. 3 is a diagrammatic side view of the rotor blade pair shown in FIG. 2.
Figure 6:
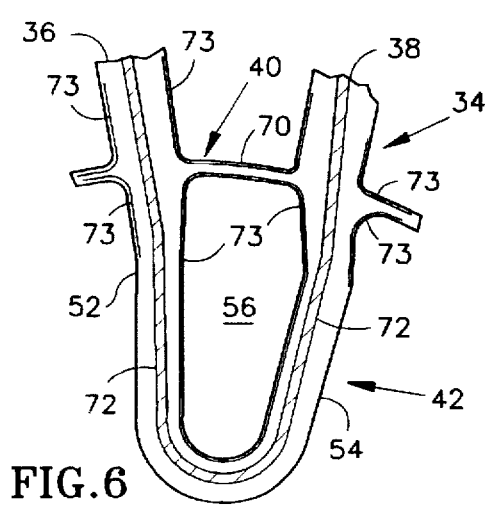
FIG. 6 is a diagrammatic partial sectional view of a composite rotor blade pair showing first and second fibers.

Referring to FIG. 2, in the preferred embodiment the blade pairs 34 are fabricated from composite materials which include a plurality of first 72 and second 73 fibers disposed within a composite matrix. The first fibers 72 extend from, or near, the tip 60 of one airfoil 36,38 down through the platform 40, into one blade root wall 52,54, up through the other blade root wail 54,52, back through the platform 40, and into the other airfoil 38,36, terminating at or near the tip 60. The second fibers 73 are positioned adjacent the first fibers 72, extending along the airfoils 36,38 and root 42. The second fibers 73 also extend throughout the platform 40. For example, second fibers 73 can extend from a section of platform 40 into a blade root wall 52,54, or from the platform 40 into an airfoil 36,38, or from one airfoil 36,38 through the platform interblade region 70, and into the other airfoil 38,36. The first fibers 72 have a Modulus of Elasticity value higher than that of the second fibers 73, and are therefore "stiffer" than the second fibers 73. The second fibers 73, however, have a higher percentage of elongation at failure than the first fibers 72.

The distribution of the first 72 and second 73 fibers within the blade pair 34 and the mechanical properties of the first 72 and second 73 fibers give the blade pair 34 desirable performance characteristics. The alignment between the airfoils 36,38 and blade root walls 52,54 enables the first fibers 72 to extend in a continuous manner throughout the blade pair 34. As a result, the radial pull lines extend linearly, or nearly linearly, through each airfoil 36,38 and its aligned blade root wall 52,54, which in turn optimizes the load capacity of the blade pair 34. The distribution of the lesser strength second fibers 73, particularly in the platform interblade region 70, gives the blade pair 34: 1) adequate shear and bending stiffness to avoid vibration related fatigue problems; and 2) the ability to dissipate energy transferred from a foreign object impacting one or both airfoils. Lower energy foreign object impacts are accommodated by allowing the energy of the impact to transfer into and dissipate within the platform 40, thereby minimizing the damage to the airfoil(s) 36,38 and root 42. Higher energy foreign object impacts are also accommodated by transferring the energy of the impact into the platform 40. If the impact energy is great enough, however, the platform will partially or completely buckle and fail while dissipating the energy of the impact. The platform 40 is sacrificed, if necessary, to keep the airfoils 36,38 attached, which in turn minimizes further damage within the engine 10. The constituent material of the first 72 and second 73 fibers will depend upon the application at hand. Carbon fibers and glass fibers are examples of first and second fiber materials, respectively.

II. The Rotor Disk

Referring to FIGS. 1, and 7–9, the rotor disk 32 includes a forward web 74 and an aft web 76. The forward web 74 includes an inner surface 78, a forward spool attachment member 80, a forward flange 82, a center hub 84, and a plurality of first stub shafts 86. The inner surface 78 is disposed at an angle "φ" relative to a radial line 80 perpendicular to the axis of rotation 28. The first stub shafts 86 are distributed around the circumference of the forward web 74, extending out from the inner surface 78. Each first stub shaft 86 extends lengthwise between an axial end 88 and a web end 90. The web end 90 of each first stub shaft 86 is preferably integrally attached, by a metallurgical bond for example, to the inner surface 78 of the forward web 74.

The aft web 76 includes an inner surface 92, an aft spool attachment member 94, a center hub 96, and a plurality of second stub shafts 98. The inner surface 92 of the aft web 76 is disposed at an angle "λ" relative to a radial line 100 perpendicular to the axis of rotation 28. The second stub shafts 98 are distributed around the circumference of the aft web 76, extending out from the inner surface 92. Each second stub shaft 98 extends lengthwise between an axial end 102 and a web end 104. The web end 104 of each second stub shaft 98 is preferably integrally attached, by a metallurgical bond for example, to the inner surface 92 of the aft web 76.

Figure 9:
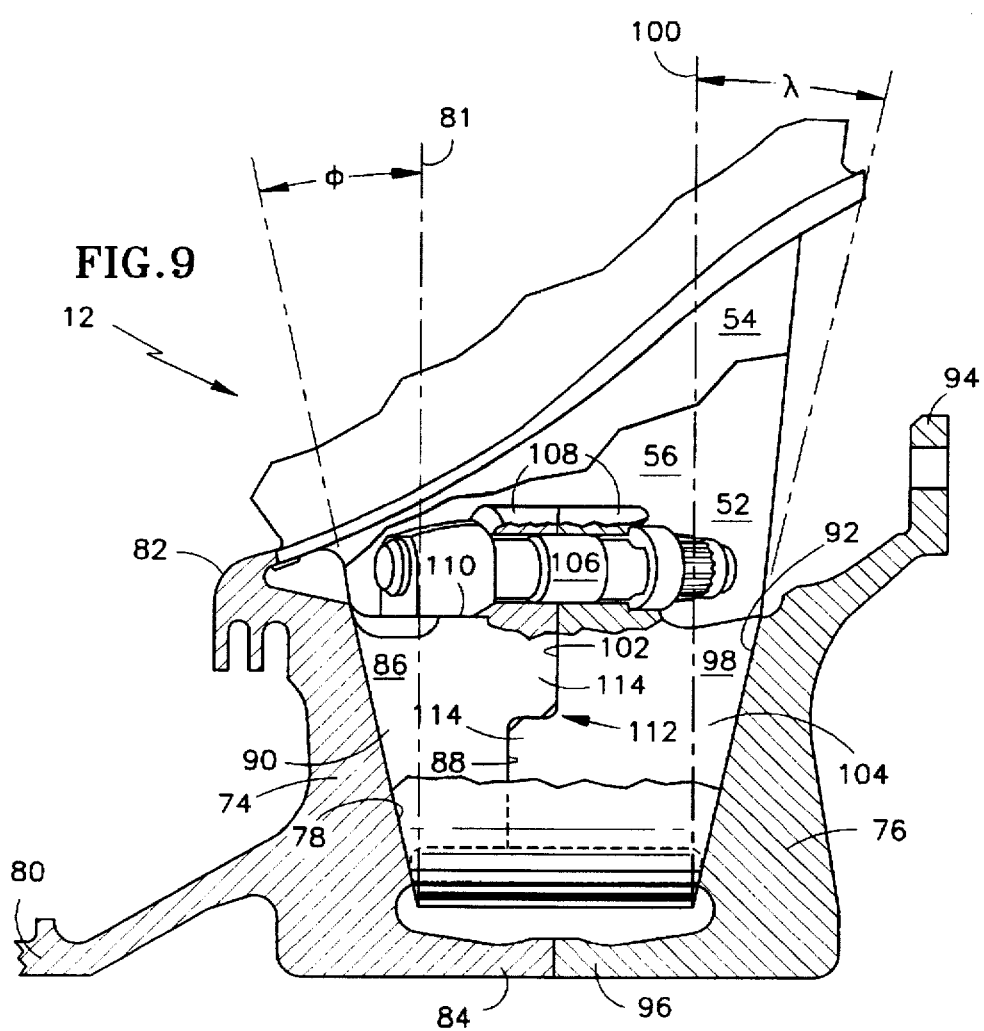
FIG. 9 is a diagrammatic partial view of the present invention with a disk attached thereto, shown partially broken away.

The first and second stub shafts 86,98 are equal in number, and similarly spaced around the axial centerline 28. Each first stub shaft 86 aligns with a second stub shaft 98, and vice versa. A plurality of fasteners 106, such as nut and bolt pairs, attach the first and second stub shafts 86,98, and therefore the webs 74,76, to one another. In the preferred embodiment, each first and second stub shaft 86,98 includes a flange 108 adjacent the axial end 88,102, extending out from the outer radial surface 110 of the stub shaft 86,98. The flanges 108 of the aligned stub shafts 86,98 align with one another, and the fasteners 106 couple the aligned stub shafts 86,98 through the flanges 108. The first and second stub shafts 86,98 may also include mating surfaces 112 disposed in the axial end 88,102 of each shaft 86,98. FIGS. 1 and 9, illustrate one embodiment of the mating surfaces 112 where each first and second stub shaft 86,98 includes a tongue 114 extending into the other shaft 98,86. Other mating surfaces 112 may be used alternatively.

The stub shafts 86,98 extend between the forward 74 and aft 76 webs, skewed from the axis of rotation 28 and spiraling between webs 74,76 in a manner similar to that of the blade roots 42 described above. The amount of skew between the stub shafts 86,98 and the axis of rotation 28 is substantially equal to the skew between the chord lines of the airfoils 36,38 and the axis of rotation 28 and is, therefore, represented by the same angle "α". The amount of spiral (or "twist") along the length of the combined stub shafts 86,98 is likewise shown as angle "β", heretofore described as the amount of spiral within the blade pair root 42. The skew angle "α" and spiral angle "β" magnitudes will depend upon the application at hand. An advantage of the present invention is that a variety of skew angles and degrees of spiral can be accommodated, thereby giving the present invention considerable versatility.

Referring to FIG. 9, the fan section 12 is assembled by receiving the first stub shafts 86 in the blade root hollows 56 of an appropriate number of rotor blade pairs 34. Next, the second stub shafts 98 are inserted into the hollows 56 and aligned with the first stub shafts 86. At this point, the inner surfaces 78,92 of the forward 74 and aft 76 webs, disposed at angles "φ" and "λ" respectively, maintain the blade pairs 34 in position and thereby facilitate assembly. The fasteners 106 are subsequently inserted into the flanges 108 on the outer radial surface 110 of the stub shafts 86,98 and tightened to attach the stub shafts 86,98, and therefore the webs 74,76, together.

Although this invention has been shown and described with respect to the detailed embodiments thereof, it will be understood by those skilled in the art that various changes in form and detail thereof may be made without departing from the spirit and the scope of the invention. For example, the present invention rotor assembly is described herein as a fan rotor assembly. The present invention rotor assembly may be used in compressor and/or turbine applications alternatively. As a second example, present invention blade pairs 34 are described in the best mode as being composite structures. The blade pairs are not limited, however, to composite materials. An alloy blade pair 34 with a platform 40 designed to absorb energy in the manner described, could be used alternatively.

We claim:

1. A gas turbine engine rotor assembly disk for rotation around an axis of rotation, comprising:

a forward web;

a plurality of first stub shafts, each having a first axial end, a first web end attached to said forward web, and a length extending between said first axial end and said first web end, wherein said first stub shafts extend out from said forward web skewed from the axis of rotation;

an aft web;

a plurality of second stub shafts, each having a second axial end, a second web end attached to said aft web, and a length extending between said second axial end and second web end, wherein said second stub shafts extend out from said aft web skewed an amount substantially equal to that of said first stub shafts relative to the axis of rotation;

wherein said first and second stub shafts are equal in number, and similarly spaced around the axis of rotation of said disk; and a plurality of fasteners, attaching said first and second stub shafts to one another.

2. A rotor assembly disk according to claim 1, wherein each said first stub shaft spirals between said first web end and said first axial end, and each said second stub shaft spirals between said second web end and said second axial end.

3. A rotor assembly disk according to claim 2, wherein said second stub shafts spiral an amount substantially equal to said spiral of said first stub shafts.

4. A rotor assembly disk according to claim 1, wherein each said first stub shaft includes a first attachment flange extending out from an outer radial surface adjacent said first axial end, and each said second stub shaft includes a second attachment flange extending out from an outer radial surface adjacent said second axial end;

wherein said first and second attachment flanges align with one another, and said fasteners are disposed in said first and second attachment flanges.

5. A rotor assembly disk according to claim 4, wherein one of said forward or aft webs includes means for attaching said disk to a spool.

6. A rotor assembly disk according to claim 5, wherein said first and second axial ends of said first and second stub shafts, respectively, fit together as mating pairs.

7. A rotor assembly disk according to claim 6, wherein one of said first axial end or said second axial end includes a female mating surface and the other of said first axial end or said second axial end includes a male mating surface, wherein said male mating surface is received within said female mating surface when said first and second stub shafts are attached to one another by said fasteners.

8. A rotor assembly disk according to claim 6, wherein said lengths of said first and second stub shafts are substantially equal.

9. A gas turbine engine rotor assembly disk for rotation around an axis of rotation, comprising:

a forward web;

a plurality of first stub shafts, each having a first axial end, a first web end attached to said forward web, and a length extending between said first axial end and said first web end, wherein each said first stub shaft spirals between said first web end and said first axial end;

an aft web;

a plurality of second stub shafts, each having a second axial end, a second web end attached to said aft web, and a length extending between said second axial end and said second web end, wherein each said second stub shaft spirals between said second web end and said second axial end, wherein said first and second stub shafts are equal in number, and similarly spaced around the axis of rotation of said disk; and a plurality of fasteners, attaching said first and second stub shafts to one another.

10. A rotor assembly disk according to claim 9, wherein said second stub shafts spiral an amount substantially equal to said spiral of said first stub shafts.

11. A rotor assembly disk according to claim 9, wherein each said first stub shaft includes a first attachment flange extending out from an outer radial surface adjacent said first axial end, and each said second stub shaft includes a second attachment flange extending out from an outer radial surface adjacent said second axial end;

wherein said first and second attachment flanges align with one another, and said fasteners are disposed in said first and second attachment flanges.

12. A rotor assembly disk according to claim 11, wherein one of said forward or aft webs includes means for attaching said disk to a spool.

13. A rotor assembly disk according to claim 12, wherein said first axial and said second axial ends of said first and second stub shafts, respectively, fit together as mating pairs.

14. A rotor assembly disk according to claim 13, wherein one of said first axial end or said second axial end includes a female mating surface and the other of said first axial end or said second axial end includes a male mating surface, wherein said male mating surface is received within said female mating surface when said first and second stub shafts are attached to one another by said fasteners.

15. A rotor assembly disk according to claim 14, wherein said lengths of said first and second stub shafts are substantially equal.

* * * * *